United States Patent [19]

Palinkas

[11] Patent Number: 4,962,916
[45] Date of Patent: Oct. 16, 1990

[54] COMPRESSION SPRING

[75] Inventor: Richard L. Palinkas, Northfield, Conn.

[73] Assignee: Uniroyal Chemical Company, Inc., Middlebury, Conn.

[21] Appl. No.: 439,117

[22] Filed: Nov. 17, 1989

[51] Int. Cl.$^5$ .......................... F16F 1/52; F16F 13/00
[52] U.S. Cl. .................................. 267/153; 267/220; 267/293
[58] Field of Search ............... 267/64.19, 64.23, 64.25, 267/33, 34, 35, 141, 141.6, 292, 293, 294

[56] References Cited

U.S. PATENT DOCUMENTS

| | | | |
|---|---|---|---|
| 2,981,534 | 4/1961 | Peras | 267/220 |
| 3,118,659 | 1/1964 | Paulsen . | |
| 3,263,983 | 8/1966 | Bliven | 267/220 |
| 3,263,985 | 8/1966 | Planta . | |
| 3,402,924 | 9/1968 | Rix . | |
| 3,409,284 | 11/1968 | Rix . | |
| 3,412,990 | 11/1968 | Gladstone | 267/220 |
| 4,042,259 | 8/1977 | Fielder et al. . | |
| 4,175,770 | 11/1979 | Draisbach et al. . | |
| 4,235,427 | 11/1980 | Bialobrzeski . | |
| 4,477,061 | 10/1984 | Kawaura et al. | 267/220 |
| 4,651,977 | 3/1987 | Buma | 267/220 |
| 4,653,735 | 3/1987 | Buma | 267/220 |
| 4,673,171 | 6/1987 | Buma | 267/220 |
| 4,771,083 | 9/1988 | Altounian | 521/159 |

*Primary Examiner*—Duane A. Reger
*Attorney, Agent, or Firm*—Raymond D. Thompson

[57] ABSTRACT

An elastomeric spring useful as an automotive shock or strut end-of-travel bumper having at least three distinct spring rates made possible by a series of roughly cylindrical, hollow elastomeric tubes stacked with the axes of the tubes normal to the axis of deflection of the spring. The tubes collapse sequentially to yield multiple spring rates. Non uniform wall thickness tubes, roll axially over the outer peripheral surface of the thicker walls of adjacent tubes during deflection.

14 Claims, 4 Drawing Sheets

COMPRESSION SPRING

BACKGROUND OF THE INVENTION

This invention relates to elastomeric springs, particularly for use as auxiliary jounce bumpers for shock absorbers and MacPherson type automobile strut assemblies.

In motor vehicles having wheel suspensions utilizing MacPherson suspension struts, an important aspect of the ride characteristics of the vehicle is determined by the spring rate characteristics of the elastomeric auxiliary spring which engages when the telescoping rod of the hydraulic damper or hydraulic shock absorber nears the end of its travel and approaches the outer shell of the shock absorber. This point in the travel of the strut is called full jounce. At finite distance approaching full jounce, the elastomeric auxiliary spring must engage the end of the shock absorber to gradually yet firmly slow down and stop the travel of the strut rod prior to the end of its mechanical travel path. It is very desirable to have variable spring rates in the elastomeric auxiliary spring to gradually decelerate and stop the movement of the strut rod prior to full jounce. Auxiliary springs of various shapes and configurations are known which are made of rubber. In general the rubber springs have at most a two stage spring rate curve which limits the flexibility of the designer in optimizing ride characteristics of the vehicle. A polyurethane foam spring structure is known which exhibits a two stage spring rate. This foam polyurethane is based on a micro cellular foam produced from a polyester reacted with a naphthalene diisocyanate. The disadvantage of the foam products made with this type of polyester naphthalene diisocyanate is that the prepolymer has a very short pot life indicating limited stability/not more than three hours, whereupon its viscosity becomes uncontrollable and the finished characteristics of the microcellular foam product is too irregular to be useful. Further the polyesters and naphthalene diisocyanate are relatively expensive and have handling problems in manufacturing since the polyester is a solid material and the naphthalene diisocyanate is an aromatic material which is generally considered slightly hazardous to handle. An object of the invention is to provide a spring device having multiple spring rates which allow the spring rate to progressively go from soft to very hard. A further object is to provide a configuration which upon collapsing during the stroke of the device on which it is mounted there is little growth of external circumscribed volume. A further object is to provide a light weight device. Yet another object is to provide a spring made of material which has little permanent set.

SUMMARY OF THE INVENTION

The elastomeric spring of this invention is a series of collapsible hollow generally cylindrical lobes made of a very stiff elastomer. The simplest of the embodiments utilizes a first lobe having a non uniform wall thickness and a large outer diameter. A second lobe is integrally molded with the first lobe and has a substantially uniform wall thickness and a smaller outer diameter than the first lobe. The non uniform wall thickness lobe has the thin portion of the wall adjacent to the second lobe which assists in urging the upper or the nonuniform wall thickness lobe to roll preferentially over the outer peripheral surface of the second lobe during the collapsing of the spring in service.

This design allows the top lobe to roll onto the middle lobe during deflection without substantial expansion of the diameter of the device. Also the design gives progressive spring rates. As the top lobe collapses it gives a soft spring rate. Then the center thick wall lobe collapses giving a slightly stiffer spring rate. Then when the entire structure collapses, the spring rate is determined by the characteristics of the solid elastomer from which it is made. The preferred material for manufacture is polyurethane having a hardness of forty to fifty-five shore D durometer. Such a device provides or satisfies the objects earlier described and yields the advantages set forth above.

DETAILED DESCRIPTION OF THE INVENTION

Figure 1:
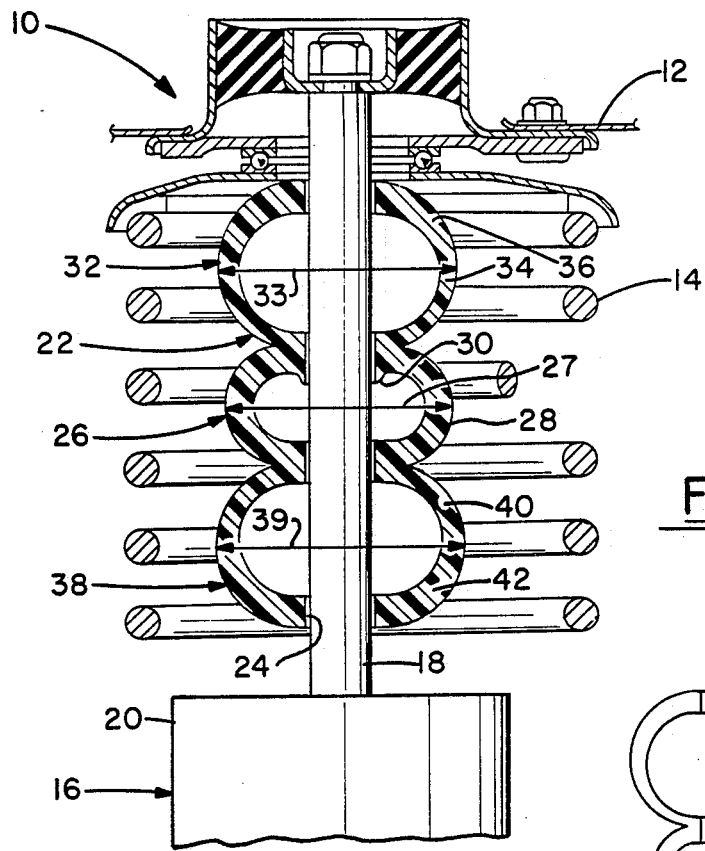
FIG. 1 is a cross sectional view of a portion of a conventional MacPherson strut type suspension having a spring of this invention mounted in the strut.

FIG. 1 a MacPherson strut suspension. The strut assembly 10 is connected to the vehicle body 12. The load of the vehicle is supported by the coil spring 14 and the damping function is provided by shock absorber assembly 16. The shock absorber 16 contains conventional hydraulic damping fluid and a piston which is connected to the rod 18 which extends axially from the shock absorber casing 20. The spring 22 of this invention is disposed axially around the rod 18 and serves as an end-of-travel bumper, also described as a jounce bumper, for the shock absorber assembly 16 within a strut. The spring 22 through its multiple spring rate characteristics serves to provide progressively greater resistance to the movement of the rod 18 within the casing 20 of the shock absorber as it approaches full jounce. This is the full extent of travel of the piston, which is connected to the rod. It must be appreciated that for the ride comfort of the passenger in the vehicle, it is most desirable that as the shock absorber reaches its end of travel that its continued motion be firmly yet gently arrested. That is the function of the spring 2 of the invention.

A preferred form of the spring 22 is shown in FIG. 1. It is composed of three integral lobes which appear in axial cross section as slightly flattened cylinders, open on each radial end. It must be appreciated that the spring is not a radially symmetrical structure. Each cylinder has a predetermined length L prescribed by the space envelope requirements of the particular strut application. The spring has an axial bore 24 extending through its axial length of sufficient diameter to accommodate the rod 18. The center lobe 26 has a substantially uniform thickness wall 28 which generally has a greater radial thickness than any of the walls of the other lobes. In this preferred embodiment, the center lobe 26 also contains an integral bumper 30 which prevents the center lobe from completely collapsing during full jounce operation of the strut and thereby prevents pinching at widest portion. The upper lobe 32 is characterized by its nonuniform wall thickness. It has a thin portion 34 and a thick portion 36 to its wall. The thin portion 34 is always adjacent to the center lobe 26 and the thick portion is axially distant from the center lobe. This orientation is repeated on the lower lobe 38 which also has a non uniform wall thickness with the thin portion 40 being adjacent to the center lobe and the thick portion 42 of the wall being axially distal the center lobe 26. The outside diameters of the lobes are also of critical significance. The outside diameter 27 of the center lobe 26 must be of lesser dimension than the outside diameters 33, 39 of the upper and lower lobes 32 and 38. During compression of the spring 22 by the casing of the shock absorber 20, the upper and lower lobes 32, 38 roll downward and upward respectively over the outer periphery of the center lobe 26. The nominal outside diameter of the whole assembly changes very little during deformation which is a substantial advantage in an application such as a strut where there is a fixed space envelope in which the device must operate both compressed and uncompressed.

Figure 2:
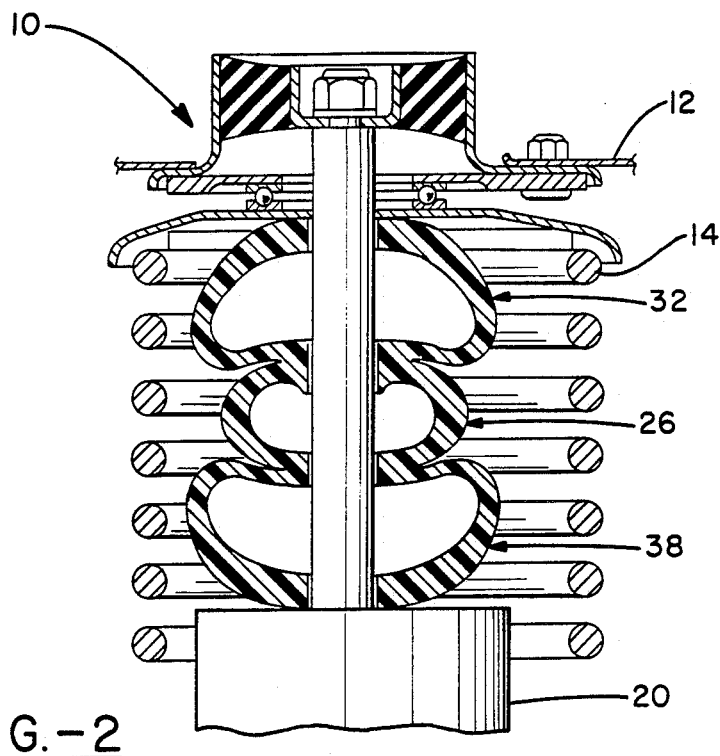
FIG. 2 shows the spring of the invention deforming in partial deflection.

FIG. 2 shows the suspension strut of FIG. 1 in a partially deflected condition where the coil spring is being compressed and the spring of the invention is in a partially compressed condition. Note how the upper and lower lobes 32, 38 have rolled down along the outer periphery of the center lobe 26. Under greater deflection, the center lobe will begin to collapse. In a later stage of the compression the upper and lower lobes 32 and 36 would have rolled down over an essentially compressed center lobe 26 to yield a stiffer spring rate. The reason for the critical sequential collapse of the lobes is related to the dimensional differences in the wall thickness. The center lobe wall 28 has a thick, substantially uniform wall, while the upper and lower lobes have much thinner walls, at least in the portion which is adjacent to the center lobe 26.

Figure 4:
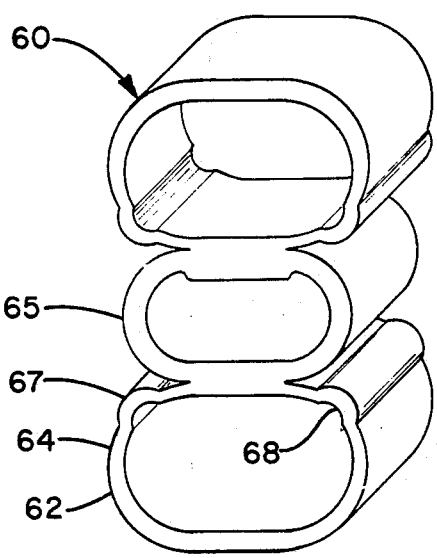
FIG. 4 is a perspective view of a three lobe spring of the invention including stress relief corrugations.
Figure 3:
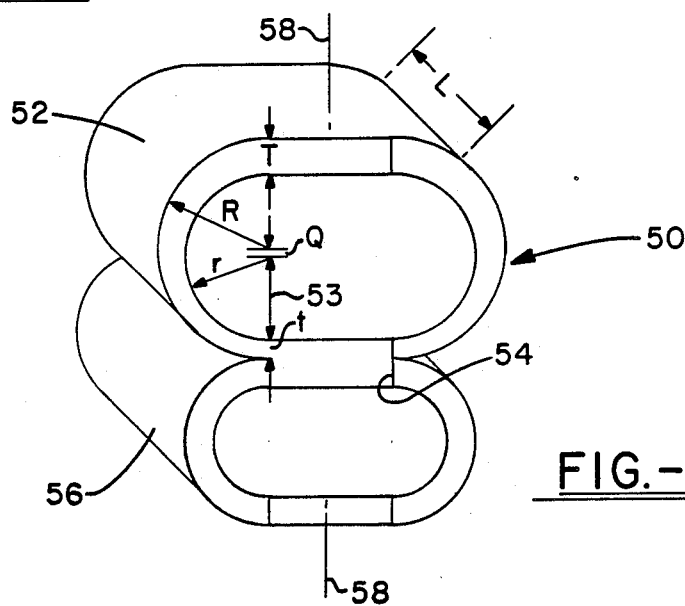
FIG. 3 is a cross sectional view of two lobe spring of the invention.

FIG. 4 shows the three lobe spring 60 similar in most respects to spring 22 shown in FIGS. 1 and 2. This alternate embodiment of the invention provides for a slight variation in the smooth arcuase wall 64 of larger diameter love 2 as shown in FIG. 4. Reference is now made to the geometric representations of FIG. 3 in describing the stress relaxation corrugation 6 in wall 0.64 of the spring 60. In axial cross section, the corrugation 66 is formed by an arc 68 of radius m' centered substantially on the inner peripheral surface 69 which is geometrically defined by a semicircle of radius r, as shown in FIG. 3. The wall thickness of the corrugation 66 is essentially equal to wall or either side of the arc 68. The radius r' can vary from about 0.5 to 2.0 times the wall thickness at the point. The arc 68 may be radiused or blended into the akjacent wall 64 to minimize localized stresses. The location of the corrugation 66 can be anywhere in the lower half of wall 64 adjacent to the smaller diameter lobe 65. The optional location is experimentally located in that portion 67 of wall 64 which undergoes maximum angular deflection during full collapse of the lobe 62.

Figure 5:
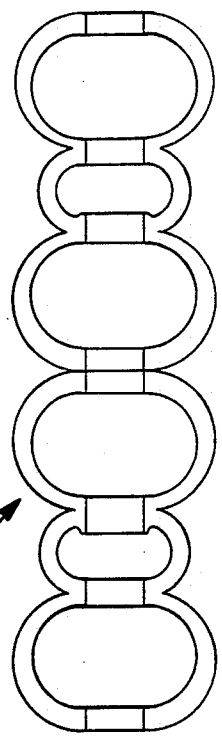
FIG. 5 is a cross sectional view of a six lobe spring of the invention.

FIG. 5 depicts a six lobed spring 70 which can be used in applications requiring long working strokes. The six lobed spring 70 is essentially a pair of three lobed springs 60 set one on top of the other and integrally molded into a single unit.

FIG. 3 depicts the simplest form of the invention. The specific geometry and dimensions of the preferred form of the invention are also shown on FIG. 3. In order to achieve the critical wall structure of the larger lobe 52 of FIG. 3, certain design principles should be followed.

The centers of the O.D. and I.D. of the large lobe should be displaced to cause larger lobe to deflect over the smaller lobe 56. The lobes 56, 52 are coaxially aligned along an axis of deflection 58. The amount of displacement of the centers is shown in FIG. 3 as Q. Q is defined as the displacement of centers along the geometric center line 53. This center lobe 53 will generally be coincident with the bore 54, although in certain embodiments these may be slightly offset. R is the outer radius, r is the inner radius. T is the maximum wall thickness, t is the minimum wall thickness and L is the length of the spring.

$$t = R - r - Q$$

$$T = R - r + Q$$

The ratio of maximum wall thickness to minimum wall thickness should preferably be:

$\frac{T}{t}$ greater than or equal to 1.10

A more preferred $\frac{T}{t}$ ratio is about 1.2 to 3.0, most preferably, the ratio is 1.3 to 2.5

Smaller elements 56 are defined as having a smaller outside diameter (O.D.) than the paired larger element 52. The arc centers are struck from centerline 53 which is generally displaced from the radial center 58 of the spring by an amount equal to radius of the axial bore 54. The arcs which form the inner and outer surfaces of smaller element 56 are generally semi circular and the wall thickness is greater than t.

FIG. 2 shows the jounce bumper deflected with the larger elements, (upper lobe 32 and lower lobe 38.) Enveloping the smaller element (center lobe 26).

SPRING RATE CALCULATION OF THE SPRING

Spring rate is defined as the amount of force per linear measure it takes to deflect a spring.

The spring rate of a single element of the jounce bumper can be calculated approximately by the following formula:

$$K = \frac{E_o L}{\frac{.17}{W^3} + \frac{1.95}{W} - \frac{W}{4\pi}} \quad \text{(Equation 1)}$$

where $E_o$ is Young's modulus $L$ is the length of the cylinder (shown in FIG. 3)

$$W = \frac{D - d'}{D + d'}$$

$D = 2R$ (shown in FIG. 3)

$d' = 2r'$ (effective diameter) formula derived below

-continued $$t = R - r - Q$$

$$T = R - r + Q$$

let effective thickness = $t'$ $$t' = \frac{T + 2t}{3}$$

and effective radius is $r'$ $$R = r' = t'$$

therefore $r' = r + \frac{Q}{3}$

The spring rate of multiple elements stacked in series is given:

$$\frac{1}{K} = \frac{1}{K_1} + \frac{1}{K_2} + \ldots + \frac{1}{K_n} \quad \text{(Equation 2)}$$

where K is the spring rate of the assembly and n is the number of elements. $K_1 \ldots K_n$ can be calculated according to the formula given above (equation 1).

As individual elements close up, their spring rate becomes the spring rate of the solid elastomeric rectangular block that they form at this point. This spring rate is generally very high so that term drops out of equation 2 above. For example, if the nth element closes up first, then the assembly spring rate becomes $$\frac{1}{K} = \frac{1}{K_1} + \frac{1}{K_2} + \ldots + \frac{1}{K_{n-1}}$$

At this point a new slope in the load vs deflection curve is obtained. These theoretical representations of spring rates are shown in broken lines on FIG. 6. A three stage mathematical curve is shown in the broken lines on FIG. 6. The steepest slope stage is the solid elastomer spring rate of the fully collapsed spring.

Any number of stages in the load-deflection curve can be designed into the assembly depending on the elements chosen.

SPECIFIC EMBODIMENT

For a working example a jounce bumper was made with larger lobes on the two ends and a smaller center lobe similar in all respects to the spring 22 of FIGS. 1, 2 and spring 60 of FIG. 4. It had the following specifications, using the reference characters of FIG. 3 and the terminology of equation 1.

Lobes 32,38

$D = 1.0''$ (25 mm)

$d = 0.75''$ (19 mm)

$L = 1.5''$ (38 mm)

$E_o = 7,000$ psi (48.3 MPa)

$Q = 0.05''$ (1.27 mm)

$d' = 0.8''$ (20 mm)

Lobe 26

$D = 0.75''$ (19 mm)

-continued $d = 0.43''$ (11 mm)

$L = 1.5''$ (36 mm)

$Q = 0$ (0 mm)

$d' = d$ (11 mm)

So for upper and lower lobes 32, 38

$$W = \frac{D - d'}{D + d'} = 0.1111$$

$$K_{1,3} = \frac{E_o (1.5)}{122 + 17.6 - 8.8 \times 10^{-3}} = .0108$$

$E_o = 76 \frac{lb}{in}$ (13.3 kN/m)

For center lobe 26 #2

$W = .271$ $$K_2 = \frac{E_o (1.5)}{8.4 + 7.2 - .022} = 0.96$$

$E_o = 672 \frac{lb}{in}$ (117.6 kN/m)

So $\frac{1}{K} = \frac{1}{672} + \frac{2}{76}$ $K\ 36 \frac{lb}{in}$ (6.3 kN/m)

Figure 6:
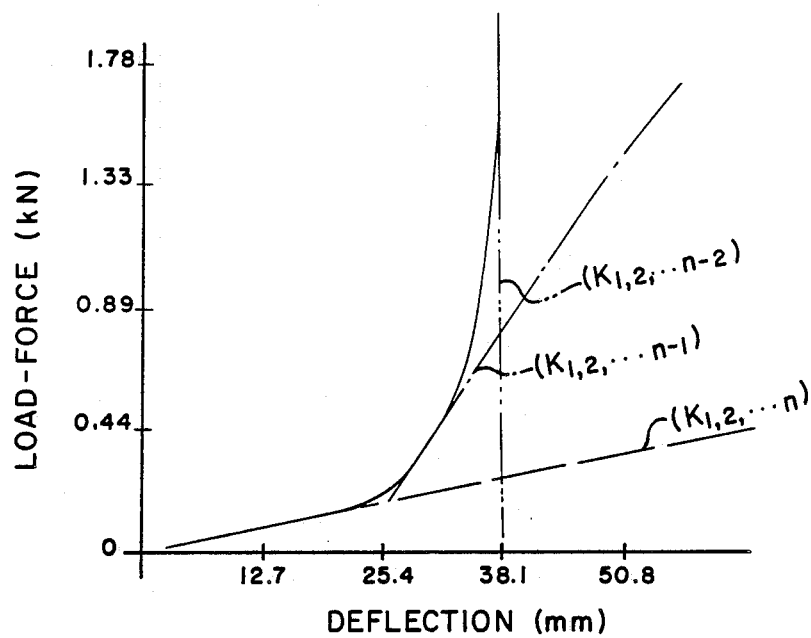
FIG. 6 shows a theoretical spring rate curve.

FIG. 6 shows a plot (solid line curve) of actual load vs. deflection for this jounce bumper. It shows a spring rate of about:

$40 \frac{lb}{in}$ (7kN/m).

Figure 7:
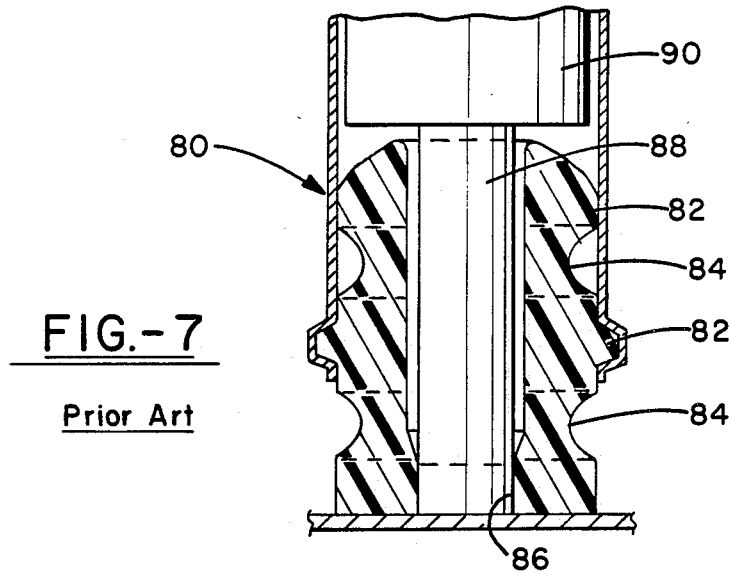
FIG. 7 shows prior art rubber or microcellular urethane spring.

FIG. 7 illustrates the configuration of a prior art microcellular urethane spring 80 which is made utilizing polyurethane identified as Vulkollan TM (trademark of Bayer or Mobay Chemical Company, Pittsburgh, Pa.). The microcellular spring 80 is made from a polyester urethane foam in which a polyester is formed into a prepolymer with naphthalene diisocyanate. The spring 80 is manufactured such that fine air cells are formed during the manufacturing process and yield a microcellular foam product which has desirable ride characteristics when used in a suspension strut but is very expensive to produce and the pot life of the urethane material is very short. It is quite common in a matter of a few hours for the viscosity to become uncontrollable and considerable waste and inconsistency of properties results by the use of such a product. A solid rubber elastomeric part having a configuration very similar to spring 80 except that the shoulder 82 and the waist 84 are less pronounced.

The rubber spring has shallower waist cutouts 84 than the microcellular urethane spring 80 which is illustrated in FIG. 7. These prior art springs are three dimensional radially symmetrical, solid bodies with the interior bore 86 for the rod 88 of the shock absorber 90.

Figure 8:
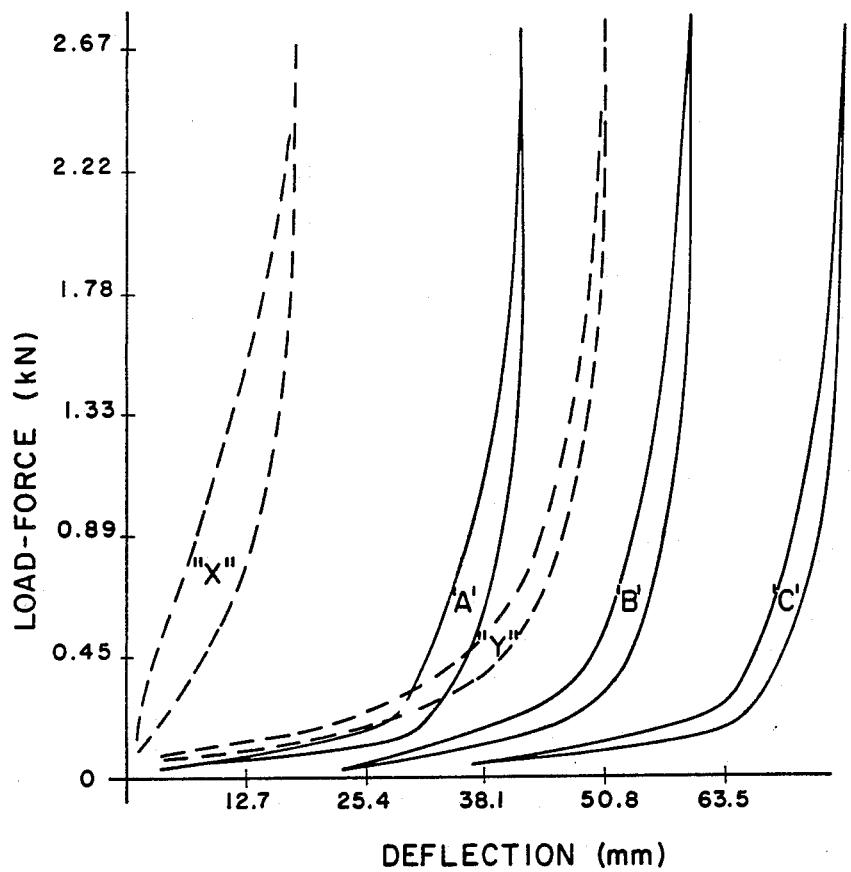
FIG. 8 shows multiple spring rate curves.

These comparative springs were tested for spring rate curves as shown in the FIG. 8 load/deflection charts. The rubber spring is identified as X and the microcellular spring rate curve as Y. Three springs, A, B, C of the present invention were molded in the same configuration as FIG. 4 in various types of solid urethane elastomer. Prototype spring A was the softest material and C was the hardest material with B in between. The curves of FIG. 8 show very good multiple spring rate characteristics for a strut jounce bumper application.

The preferred material of manufacture is a solid, elastomer having a Shore D hardness of about 40 to about 55 Durometer. A more preferred hardness range is 90 to 98 Shore A, with are most preferable being 95 to 97 Shore A.

The elastomers suitable for this application must have excellent flex life at the high hardness range expressed above. Conventional thermosetting synthetic and natural rubbers do not have the requisite flex fatigue resistance at these high hardness levels. The elastomeric material must be capable of withstanding at least 5,000; preferably 20 to 100,000 of full jounce cycles of deflection (full collapse). Polyurethanes, both thermosetting and thermoplastic types, as well as, copolyesters represented by materials like Hytrel (trademark of E. I. duPont) are also useful.

Among the polyurethanes, the two part castable urethane made from polyether-isocyanate or polyester-isocyanate prepolymers cured with organic diamine or polyol materials are most preferred as represented by the Adiprene and Vibrathane (trademarks of Uniroyal Chemical Company).

There is some inaccuracy at the lower end of the Shore D range set out above so the hardness range can be alternatively expressed as a durometer range of 90 (Shore A) up to 55 (Shore D).

Various changes and modifications may be made to the spring as described herein without departure from the slope of the invention if they are within the scope of the appended claims or equivalent thereto.

I claim:

1. An elastomeric spring having multiple spring rates comprising:
   an elastomeric body having a bore extended there through coaxial with an axis of deflection, said body being formed of a smaller diameter lobe and a larger diameter lobe integral with said smaller diameter lobe and coaxially aligned along said axis of deflection, said smaller diameter lobe having a smaller outside diameter than said larger diameter lobe, said smaller and larger diameter lobes being hollow, flattened cylinders normal to said axis of deflection having cross sections with inner peripheral surfaces formed by an opposing pair of substantially semicircular arcs connected by a pair of substantially parallel straight lines normal to the axis of deflection, said bore passing through the portion bounded by said pair of straight lines, said larger diameter lobe being adapted to roll axially over said smaller diameter lobe when subjected to a load directed along the axis of deflection and having a wall thickness which varies from a minimum thickness portion adjacent to said smaller diameter lobe to a maximum thickness portion axially distal from said smaller diameter lobe.

2. An elastomeric spring in accordance with claim 1 wherein the wall thickness of said larger diameter lobe is defined by the ratio of the maximum thickness portion to minimum thickness portion being greater than 1.1.

3. An elastomeric spring in accordance with claim 2 wherein said ratio is between about 1.2 and about 3.0.

4. An elastomeric spring in accordance with claim 1 wherein the wall thickness of said larger diameter lobe is defined by the inner peripheral surface formed by said opposing pair of substantially semi-circular arcs of radius r centered at a first point on a pair of geometric centerlines and the outer peripheral surface being formed by an opposing pair of substantially semicircular second arcs of radius R centered on a second point offset by an amount Q from said first point along said geometric centerline in a direction away from said smaller diameter lobe, and wherein r is less than R such that the wall of the large diameter lobe reaches a minimum wall thickness adjacent to said smaller diameter lobe and a maximum wall thickness distal said smaller diameter lobe, said geometeric centerlines being substantially coincident to the R radially outer edge of said bore through said body.

5. An elastomeric spring in accordance with claim 1 wherein said smaller diameter lobe has a substantially uniform wall thickness.

6. An elastomeric spring in accordance with claim 5 wherein said smaller diameter lobe wall thickness is greater than the minimum wall thickness of said larger diameter lobe.

7. An elastomeric spring in accordance with claim 4 further comprising a second larger diameter lobe being coaxially positioned adjacent to said smaller diameter lobe and axially opposite to said first larger diameter lobe such that the minimum wall thickness of said second larger diameter lobe lies adjacent said smaller diameter lobe to form a three lobe module.

8. An elastomeric spring in accordance with claim 7 wherein two or more said three lobe modules are integrally molded together such that said bore extends axially through said two or more three lobe modules.

9. An elastomeric spring in accordance with claim 1 wherein said elastomeric body is integrally formed of a solid elastomer having a Shore D hardness between about 40 and about 55 durometer.

10. An elastomeric spring in accordance with claim 9 wherein said elastomer is a polyurethane.

11. An elastomeric spring in accordance with claim 9 wherein said elastomeric body is capable of withstanding at least 5000 cycles of full axial relaxation to full axial collapse under load.

12. An elastomeric spring in accordance with claim 10 wherein said spring is made from cast thermosetting polyurethane.

13. An elastomeric spring in accordance with claim 1 wherein said elastomeric body is integrally formed of a solid elastomer having a Shore A hardness of 90 to 98 durometer.

14. An elastomeric spring in accordance with claim 3 further comprising a corrugation forming part of the wall of said larger diameter lobe and running normal to the axis of deflection in the axial half of the wall adjacent to said smaller diameter lobe.

* * * * *